Patented Jan. 18, 1944

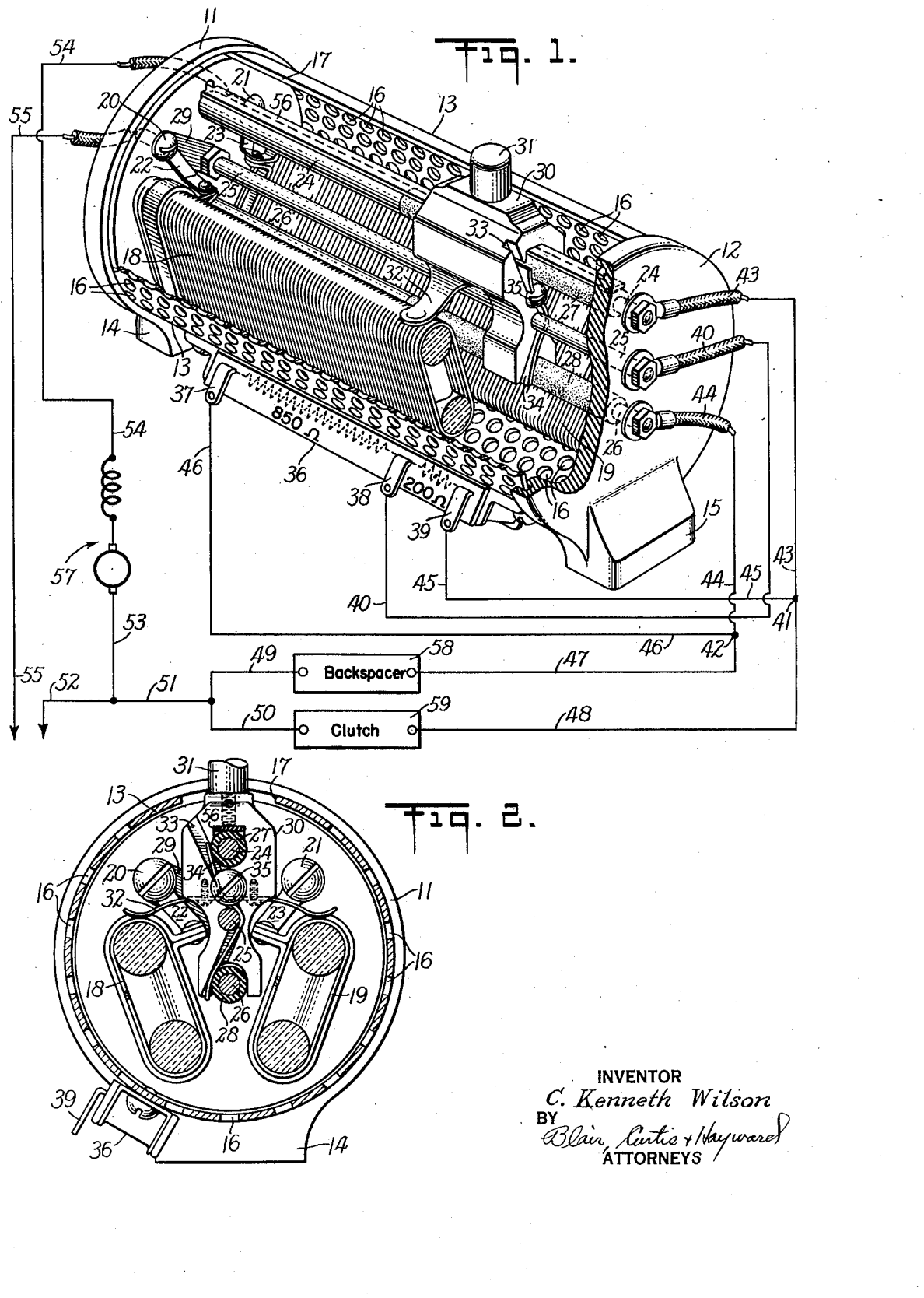

2,339,721

UNITED STATES PATENT OFFICE 2,339,721

CURRENT REGULATOR FOR PHONOGRAPHS

Charles Kenneth Wilson, Fairfield, Conn., assignor to Dictaphone Corporation, New York, N. Y., a corporation of New York Application April 29, 1942, Serial No. 440,896

5 Claims. (Cl. 171—97)

This invention relates to dictating and transcribing phonographs and, more specifically, to the control of equipment of the type illustrated in the application for patent of Leland D. Norton and John E. Renholdt, Serial No. 75,660, filed April 22, 1936, now Patent No. 2,284,836, dated June 2, 1942, and having an electric motor, an electrically controlled clutch and an electrically controlled backspacer.

From a commercial standpoint it is desirable both to the maker and to the user that equipment of this type be "universal" in the sense that it be operable on various voltage sources as, for example, upon alternating current or direct current of either 110 volts or 220 volts. By producing a universal machine, the maker need manufacture and carry in stock only a single line of equipment and the use of the equipment is not restricted to any particular type of power supply.

Heretofore, equipment of the above character has been provided with an electric motor for causing relative movement between the recording element (or the reproducing element) and the record, and for carrying out other functions of the machine. For the sake of universal application this motor is usually of the series type and is adjustable for operation on either alternating current or direct current, depending upon the type of power at hand. When such a motor is provided, the motor circuit includes a variable resistance which is adjustable to reduce the current flow through the motor if it is being run from a D. C. supply. At times the machine must be capable of operation on a range of voltages, such as 110 to 220 volts.

With the advent of various electrical controls, such as disclosed in the patent application referred to above, the problem of providing for universal use has become increasingly acute. When one of these machines is connected to a power supply, each of the control circuits must be individually checked to make sure that current flow through the motor circuit, the clutch control circuit and the backspacer control circuit is within permissible limits. If the same machine is to be used upon another source of power, the current flow must be readjusted in each circuit and the adjustments are alike for no two circuits. When these adjustments must be made individually, it is necessary to arrange the machine so that every circuit is accessible. It is imperative that none of the various circuits be overlooked; if one of the circuits is not properly adjusted when the machine is connected to a given power supply, the machine will be inoperative and may even be injured.

The present invention involves the use of equipment which may include an electric motor, an electrically controlled clutch and an electrically controlled backspacer, any one of which must be capable of operating upon either alternating current or direct current, and upon any voltage within a predetermined range. The invention offers a solution to the problems of rendering such equipment universal in a practicable manner. A phonograph incorporating the invention can be adjusted through one mechanical setting to put every circuit in proper form for use with a given power supply. More specifically, the current regulating device of this invention makes the proper adjustment in each of the control circuits automatically and simultaneously. It is unnecessary to adjust the current flow separately through the motor circuit, the clutch control circuit and the backspacer control circuit, since each of these adjustments is made automatically and in the correct amount in response to one master adjustment.

It is an object of the present invention to provide a current regulating device having to a notable extent the characteristics and capabilities above set forth. A further object is to provide equipment of the above character which may be used universally and which may be adjusted by one simple manual setting to operate properly upon various voltages. Further objects and advantages will be in part obvious and in part pointed out below.

The invention accordingly consists in the features of construction, combinations of elements and arrangements of parts as will be exemplified in the structure to be hereinafter described and the scope of the application of which will be set forth in the following claims.

In the accompanying drawing, in which is disclosed one of various possible embodiments of the invention for attaining the objectives set forth and in which like reference characters refer to like parts:

Figure 1 illustrates a perspective of the current regulating unit, with parts broken away and parts in section, schematically wired into its circuits in a phonograph of the type referred to above; and Figure 2 is a cross-section taken along the line 2—2 of Figure 1.

In the illustrative embodiment of the invention circuits are disclosed which include a unitary control mechanism and this control mechanism can be adjusted by a simple mechanical operation to adapt the entire system, including the electric motor, the clutch and the backspacer, to operate upon any one of a number of predetermined voltages or ranges of voltages, and even upon either alternating or direct current. When the regulator is embraced in the phonograph system insofar as current flow is concerned, the phonograph is ready for use with any common type of power upon the making of a single adjustment to one mechanism. Hence, the operator does not, through inadvertance, or otherwise, overlook any of the necessary adjustments which must be made when the phonograph is removed from one location and connected at another location into a different sort of power.

Figure 1 depicts schematically portions of a phonograph of the type of which the current regulator forms a part and illustrates how the regulator, shown in perspective, is incorporated in the system. The motor, indicated generally by 57, the backspacer, indicated by 58, and the clutch, indicated by 59, are shown connected in parallel between power lines 52 and 55. The motor 57 is of the universal series type. The clutch 59 is located in the driving connection between the motor and the record rotating mechanism and serves to make and break the drive therebetween. The clutch is moved into engagement, or disengagement, in response to a manual or foot control. Similarly, the backspacer 58 is associated with the motor drive mechanism to reverse the machine in response to a manual or foot control. The clutch and backspacer engaging and disengaging mechanisms are electrically motivated by solenoids. Each solenoid is of the type illustrated in the patent to Arnold H. Beede, 2,201,118, May 14, 1940, wherein the current flow through the armature is broken as soon as the solenoid has been thrown. For example, if the clutch is to be moved to the engaged position, current flows through the armature in the clutch control circuit only long enough to move the clutch into engagement, the movement itself serving to break the electric circuit. Hence, during operation, current flows continuously through the motor circuit whereas in the backspacer control circuit and in the clutch control circuit it flows only in isolated surges. The result is that current flow through the motor circuit requires more accurate control than does current flow through the clutch control circuit or through the backspacer control circuit.

The regulating device provides a variable resistance in series in the motor circuit for maintaining current flow therethrough within narrow limits. One fixed resistance is provided for the clutch control circuit, a second fixed resistance is provided for the backspacer control circuit and each fixed resistance is properly proportioned for its associated circuit. The fixed resistances, along with the variable resistance, form the heart of the regulating unit and together they afford support for the adjustable element which determines, according to its position, the resistance in any individual circuit.

Referring to Figure 1, the regulator comprises Bakelite and plates 11 and 12, having bases 14 and 15, respectively, supported in spaced apart relationship by resistance coils 18 and 19 and fixed resistance terminal rods 24, 25, and 26. The resistance coils and terminal rods are protected by the sheet metal casing 13, which includes ventilating perforations 16 and an elongated opening 17. Opening 17 permits movement of the single adjustable means, to be described.

Resistance coils 18 and 19 are connected into the motor circuit by means of the terminals 20 and 21, respectively, and the jumpers 22 and 23, respectively. The rods 24, 25, and 26 are made of metal and the portions of rods 24 and 26 toward the right side of Figure 1 are of reduced diameter and are covered with insulating bushings 27 and 28. The middle rod 25 is uninsulated throughout its length and is permanently connected to terminal 20 by means of a jumper 29.

Mounted on rods 24, 25, and 26, and slidable thereupon throughout their length and throughout opening 17, is a Bakelite adjusting block 30. The position of block 30 with respect to the three rods can be locked by tightening a clamp screw 31. A fiber strip 56 along the top of rod 24 forms an insulating bearing surface for clamp screw 31. Fastened to the under side of block 30 is a metal spring bridge 32, which makes contact with resistance coils 18 and 19 and maintains at all times a slidable connection therebetween. The face of block 30 toward the right in Figure 1 is provided with a slot 33 and within this slot is located a vertically extending metal spring bridge 34. Bridge 34 is held in place by a screw 35 and maintains at all times a slidable contact between rod 25 and rods 24 and 26. (The bushings 27 and 28 are considered to be parts of rods 24 and 26, respectively.)

Toward the bottom of casing 13 is located a fixed resistance housing 36 provided with three terminals 37, 38, and 39. A fixed resistance of 850 ohms for the backspacer circuit is connected between terminals 37 and 38 and a fixed resistance of 200 ohms for the clutch circuit is connected between terminals 38 and 39. The righthand end (Figure 1) of the middle resistance terminal rod 25 is connected to terminal 38 by a wire 40. Rod 24 is connected to a terminal 41 by a wire 43 and terminal 39 is connected to terminal 41 by a wire 45. Rod 26 is connected to a terminal 42 by a wire 44 and terminal 37 is connected to terminal 42 by a wire 46.

The electric clutch 59 is connected to terminal 41 through a wire 48 and to the main line 52 through wires 50 and 51. The electric backspacer 58 is connected to terminal 42 through a wire 47 and to the main line 52 through wires 49 and 51. Terminal 20 is directly connected to the main line 55, and terminal 21 is connected to one side of the motor by a wire 54, while the other side of the motor is connected to main line 52 by a wire 53.

In operation, the resistance coils 18 and 19 are connected across the supply lines 52, 55 in series with the motor and movement of block 30 from left to right simply increases the amount of resistance in series with the motor. When the bridge 34 is located to the left of bushings 27 and 28 the 850 ohm resistance and the 200 ohm resistance in housing 36 are short circuited, the path through the backspacer being from line 55 through terminal 20, jumper 29, rod 25, the lower half of bridge 34, rod 26, wire 44, terminal 42, wire 47, the backspacer, wire 49 and wire 51 to line 52. Similarly, the path through the clutch is from line 55 through terminal 20, jumper 29, rod 25, the upper half of bridge 34, rod 24, wire 43, terminal 41, wire 48, the clutch, wire 50 and wire 51 to line 52.

If the block 30 is to the right and so positioned that bridge 34 is in contact with the insulating bushings 27 and 28, the fixed resistances are in series with the backspacer and clutch. Then the path through the backspacer is from line 55 through terminal 20, jumper 29, rod 25, wire 40, terminal 38, the 850 ohm resistance, terminal 37, wire 46, terminal 42, wire 47, the backspacer, wire 49 and wire 51 to line 52. The path through the clutch is from line 55 through terminal 20, jumper 29, rod 25, wire 40, terminal 38, the 200 ohm resistance, terminal 39, wire 45, terminal 41, wire 48, the clutch, wire 50 and wire 51 to line 52.

In the embodiment shown, the bushings 27 and 28 are 2.188 inches long each. The arrangement is such that the fixed resistances are short circuited when the variable resistance is set for the proper motor current with a line voltage up to 165 volts D. C. or 195 volts A. C. With voltages in excess of these values, when the block 30 is adjusted to give proper motor current, the bridge 34 is in contact with bushings 27 and 28 and the fixed resistances are brought into the circuits as described above. The regulator operates on either alternating or direct current and has a range up to, and in excess of, 230 volts.

The embodiment described above is illustrative of the invention as it meets one set of conditions. Attention is directed to the fact that the dimensions and resistances set forth may be altered for different sets of conditions and although the bushings shown are 2.188 inches long each and the fixed resistances are of 200 ohms and 850 ohms, these values may be changed to meet other conditions or when the invention is embodied in other forms.

From the foregoing it will be seen that a current regulator made in accordance with the present invention is well adapted to attain the ends and objects hereinbefore set forth and to be economically manufactured. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a dictating and transcribing phonograph of the type having a plurality of electric circuits including a driving motor circuit, a clutch control circuit, and a back-spacer control circuit, the combination with said electric circuits of a current regulating device for varying the resistance in the several electric circuits of the phonograph to allow for the use of the phonograph with various types of electric power supply; said current regulating device comprising, a first resistance element adapted to govern current flow in the motor circuit, a second resistance element adapted to govern current flow in the clutch control circuit, a third resistance element adapted to govern current flow in the backspacer control circuit, and an adjustable bridging means associated with said resistance elements so that current flow through the regulating device is dependent upon the position of the bridging means, whereby each circuit is individually conditioned for a given power supply through a single adjustment to the bridging means.

2. In a dictating and transcribing phonograph of the type having a plurality of electric circuits including a driving motor circuit, a clutch control circuit, and a back-spacer control circuit, the combination with said electric circuits of a current regulating device for varying the resistance in the several electric circuits of the phonograph to allow for the use of the phonograph with various types of electric power supply; said current regulating device comprising, a variable resistance element adapted to modify current flow in the motor circuit, a fixed resistance element proportioned to modify current flow in the clutch control circuit, a fixed resistance element proportioned to modify current flow in the backspacer control circuit, and an adjustable bridging means associated with said resistance elements so that current flow through the regulating device is dependent upon the position of the bridging means, whereby each circuit is individually conditioned for a given power supply through a single adjustment to the bridging means.

3. In a dictating and transcribing phonograph of the type having a plurality of electric circuits including a driving motor circuit, a clutch control circuit, and a back-spacer control circuit, the combination with said electric circuits of a current regulating device for varying the resistance in the several electric circuits of the phonograph to allow for the use of the phonograph with various types of electric power supply; said current regulating device comprising, a variable resistance element adapted to modify current flow in the motor circuit, a fixed resistance element adapted to modify current flow in the clutch control circuit, a fixed resistance element adapted to modify current flow in the backspacer control circuit, and an adjustable bridging means associated with said resistance elements so that current flow through the regulating device is dependent upon the position of the bridging means, the arrangement being such that as resistance is decreased in the motor circuit the fixed resistances are short circuited from their respective control circuits.

4. In a dictating and transcribing phonograph of the type having a plurality of electric circuits including a driving motor circuit, a clutch control circuit, and a back-spacer control circuit, the combination with said electric circuits of a current regulating device for varying the resistance in the several electric circuits of the phonograph to allow for the use of the phonograph with various types of electric power supply; said current regulating device comprising, a first resistance element adapted to govern current flow in the motor circuit, a second resistance element adapted to govern current flow in the clutch control circuit, terminal means for said second resistance element, a third resistance element adapted to govern current flow in the backspacer control circuit, terminal means for said third resistance element, and an adjustable bridging means associated with said first resistance element and with said terminal means so that current flow through the regulating device is dependent upon the position of the bridging means, said terminal means being so constructed and arranged that predetermined relationships with the adjustable bridging means will short circuit associated resistance elements.

5. In a dictating and transcribing phonograph of the type having a plurality of electric circuits including a driving motor circuit, a clutch control circuit, and a backspacer control circuit, the combination with said electric circuits of a current regulating device adapted to render the phonograph suitable for use on various sorts of power supply by limiting current flow through the various electric circuits thereof; said regulating device including: a frame comprising two resistance coils for the motor circuit and three elongated conducting rods, said coils and rods extending along parallel axes and being fixed between two parallel resinous end plates; an adjustable resinous block slidably mounted on said three conducting rods, said block carrying a first conducting bridge providing a slidable contact across said two resistance coils and a second conducting bridge providing slidable contacts between one of said three rods and each of the remaining two thereof; a pair of insulating bushings, one of said bushings being arranged to protect a portion of one of said remaining two conducting rods from direct contact with said second conducting bridge and the other of said bushings being arranged to protect a portion of the other of said remaining two conducting rods from direct contact with said second conducting bridge; a first fixed resistance element for the clutch circuit associated with said one of said bushing insulated rods and a second fixed resistance element for the backspacer circuit associated with said other of said bushing insulated rods; and said regulating device being so constructed and arranged that, as said adjustable block is moved so as to decrease the effective resistance of said two resistance coils for the motor circuit, the second conducting bridge slides from those portions of said remaining two conducting rods covered by the insulating bushings into direct contact with said remaining two conducting rods to short circuit said two fixed resistances from the clutch circuit and from the backspacer circuit.

C. KENNETH WILSON.